US011422851B2

(12) United States Patent
LeCrone et al.

(10) Patent No.: US 11,422,851 B2
(45) Date of Patent: Aug. 23, 2022

(54) CLONING RUNNING COMPUTER SYSTEMS HAVING LOGICAL PARTITIONS IN A PHYSICAL COMPUTING SYSTEM ENCLOSURE

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 16/390,472

(22) Filed: Apr. 22, 2019

(65) Prior Publication Data

US 2020/0334073 A1    Oct. 22, 2020

(51) Int. Cl.
*G06F 9/48* (2006.01)
*G06F 11/14* (2006.01)
*G06F 3/06* (2006.01)
*G06F 9/50* (2006.01)
G06F 9/455 (2018.01)

(52) U.S. Cl.
CPC .......... *G06F 9/4856* (2013.01); *G06F 3/0617* (2013.01); *G06F 3/0647* (2013.01); *G06F 9/5077* (2013.01); *G06F 11/1415* (2013.01); G06F 3/067 (2013.01); G06F 9/5088 (2013.01); G06F 2009/4557 (2013.01); G06F 2009/45562 (2013.01); G06F 2009/45575 (2013.01); G06F 2009/45583 (2013.01); G06F 2201/84 (2013.01)

(58) Field of Classification Search
None
See application file for complete search history.

(56) References Cited

U.S. PATENT DOCUMENTS

| 10,705,924 | B1* | 7/2020 | Thakur | G06F 9/4856 |
| 10,891,140 | B1* | 1/2021 | Levin | G06F 9/45533 |
| 2008/0222633 | A1* | 9/2008 | Kami | G06F 9/5077 718/1 |
| 2008/0256321 | A1* | 10/2008 | Armstrong | G06F 9/5077 711/173 |

(Continued)

*Primary Examiner* — Abu Zar Ghaffari
(74) *Attorney, Agent, or Firm* — Muirhead and Saturnelli, LLC

(57) ABSTRACT

Cloning a running computing system includes quiescing processes running on a source computing system, saving state data of the source computing system, configuring a target computing system using the state data from the source computing system, and resuming program execution at the source computing system and the target computing system. Quiescing processes running on the source computing system may include marking all of the processes on the source computing system as non-dispatchable. All external resources may be identified for the source computing system prior to quiescing processes running on a source computing system. The external resources may include devices and files. The target computing system may access data that is also accessed by the source computing system. Data accessed by the source computing system may be cloned for access by the target computing system prior to resuming program execution. The data may be cloned using snapshot copies.

16 Claims, 4 Drawing Sheets

(56) References Cited

U.S. PATENT DOCUMENTS

| | | | | |
|---|---|---|---|---|
| 2009/0089781 | A1* | 4/2009 | Shingai | G06F 9/5077 718/1 |
| 2009/0265706 | A1* | 10/2009 | Golosovker | G06F 3/0655 718/1 |
| 2009/0282101 | A1* | 11/2009 | Lim | G06F 11/1471 709/203 |
| 2010/0088771 | A1* | 4/2010 | Heller | G06F 9/45558 726/28 |
| 2010/0287560 | A1* | 11/2010 | Neft | G06F 9/5077 718/104 |
| 2011/0161695 | A1* | 6/2011 | Okita | G06F 1/3278 713/310 |
| 2012/0054731 | A1* | 3/2012 | Aravamudan | G06F 8/63 717/170 |
| 2012/0226860 | A1* | 9/2012 | Saito | G06F 3/067 711/118 |
| 2013/0014103 | A1* | 1/2013 | Reuther | G06F 3/0647 718/1 |
| 2013/0159650 | A1* | 6/2013 | Wakamiya | G06F 9/461 711/162 |
| 2013/0166504 | A1* | 6/2013 | Varkhedi | G06F 16/275 707/610 |
| 2013/0263130 | A1* | 10/2013 | Sugihara | G06F 9/45558 718/1 |
| 2013/0268932 | A1* | 10/2013 | Park | G06F 9/45533 718/1 |
| 2013/0275708 | A1* | 10/2013 | Doi | H04L 63/1425 711/165 |
| 2013/0326177 | A1* | 12/2013 | Oiwa | G06F 3/0647 711/162 |
| 2014/0025922 | A1* | 1/2014 | Heller | G06F 12/1027 711/206 |
| 2014/0173181 | A1* | 6/2014 | Beveridge | G06F 9/5088 711/103 |
| 2014/0359130 | A1* | 12/2014 | Southern | G06F 9/4856 709/226 |
| 2015/0006835 | A1* | 1/2015 | Oberhofer | G06F 11/1666 711/162 |
| 2015/0067390 | A1* | 3/2015 | Blake | G06F 9/45558 714/15 |
| 2016/0055026 | A1* | 2/2016 | Fitzgerald | H04L 63/1433 718/1 |
| 2016/0180099 | A1* | 6/2016 | Potlapally | H04L 9/0838 713/189 |
| 2018/0107509 | A1* | 4/2018 | Shaw | G06F 9/4856 |
| 2018/0232251 | A1* | 8/2018 | Dow | G06F 9/45558 |
| 2019/0286475 | A1* | 9/2019 | Mani | G06F 9/45558 |

* cited by examiner

CLONING RUNNING COMPUTER SYSTEMS HAVING LOGICAL PARTITIONS IN A PHYSICAL COMPUTING SYSTEM ENCLOSURE

TECHNICAL FIELD

This application relates to the field of computer systems and, more particularly, to the field of cloning running computing systems.

BACKGROUND OF THE INVENTION

DevOps enables software development and operations teams to accelerate software development and delivery through automation, collaboration, fast feedback, and iterative improvement. A component of DevOps is an agile approach to software development which requires, among other things, a significant number of relatively incremental changes to the software rather than a smaller number of substantial changes. The incremental changes are tested at each iteration prior to advancing to a next stage of changes. One way to test the changes is to use a production computing system during off hours to run the newly-developed software. However, for some businesses, such as financial institutions, there are no significant "off" hours to use production computing systems. In such a case, a replica of a production computing system that accesses production data or a copy/clone thereof may be used.

A drawback to using a replica of a production computing system is that there may be differences between the replica and the production computing systems that cause errors in the software to become apparent only after the software is moved to the production computing system. This may be addressed by using virtual machines for production computing systems. Since virtual machines are essentially a collection of software and state data, it is relatively trivial to produce a clone of a virtual machine that is identical to a source version used in a production system. However, cloning a physical computing system is not as straightforward. Although mechanisms exist to clone physical computing systems, these mechanisms require powering down or at least suspending the physical computing systems and then booting up both the source (original) computing system and the target (clone) computing system after making the clone. In a production environment where computing systems are essentially running constantly, this may not be acceptable. In addition, the time it takes to power down and reboot production computing systems may also not be unacceptable.

Accordingly, it is desirable to be able to clone running physical computing systems without needing to power down or reboot the systems.

SUMMARY OF THE INVENTION

According to the system described herein, cloning a running computing system includes quiescing processes running on a source computing system, saving state data of the source computing system, configuring a target computing system using the state data from the source computing system, and resuming program execution at the source computing system and the target computing system. Quiescing processes running on the source computing system may include marking all of the processes on the source computing system as non-dispatchable. All external resources may be identified for the source computing system prior to quiescing processes running on a source computing system. The external resources may include devices and files. The target computing system may access data that is also accessed by the source computing system. Data accessed by the source computing system may be cloned for access by the target computing system prior to resuming program execution. The data may be cloned using snapshot copies. The state data may include program status word values of processes in a running state on the source computing system, control registers, general registers, and contents of internal memory of the source computing system. The source computing system and the target computing system may be provided by logical partitions that are co-located in a physical computing system enclosure. All processors may be taken off line prior to saving a state of the source computing system.

According further to the system described herein, a non-transitory computer readable medium contains software that clones a running computing system. The software includes executable code that quiesces processes running on a source computing system, executable code that saves state data of the source computing system, executable code that configures a target computing system using the state data from the source computing system, and executable code that resumes program execution at the source computing system and the target computing system. Quiescing processes running on the source computing system may include marking all of the processes on the source computing system as non-dispatchable. All external resources may be identified for the source computing system prior to quiescing processes running on a source computing system. The external resources may include devices and files. The target computing system may access data that is also accessed by the source computing system. Data accessed by the source computing system may be cloned for access by the target computing system prior to resuming program execution. The data may be cloned using snapshot copies. The state data may include program status word values of processes in a running state on the source computing system, control registers, general registers, and contents of internal memory of the source computing system. The source computing system and the target computing system may be provided by logical partitions that are co-located in a physical computing system enclosure. All processors may be taken off line prior to saving a state of the source computing system.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism for cloning a running physical computing system that does not require rebooting or powering down the source computing system. Program execution is suspended to quiesce the state of the source computing system without powering down or otherwise suspending the source computing system and the state of the hardware of the source computing system is duplicated at the target computing system. Both the source computing system and the target computing system then continue to run once program execution is resumed on both.

Figure 1:
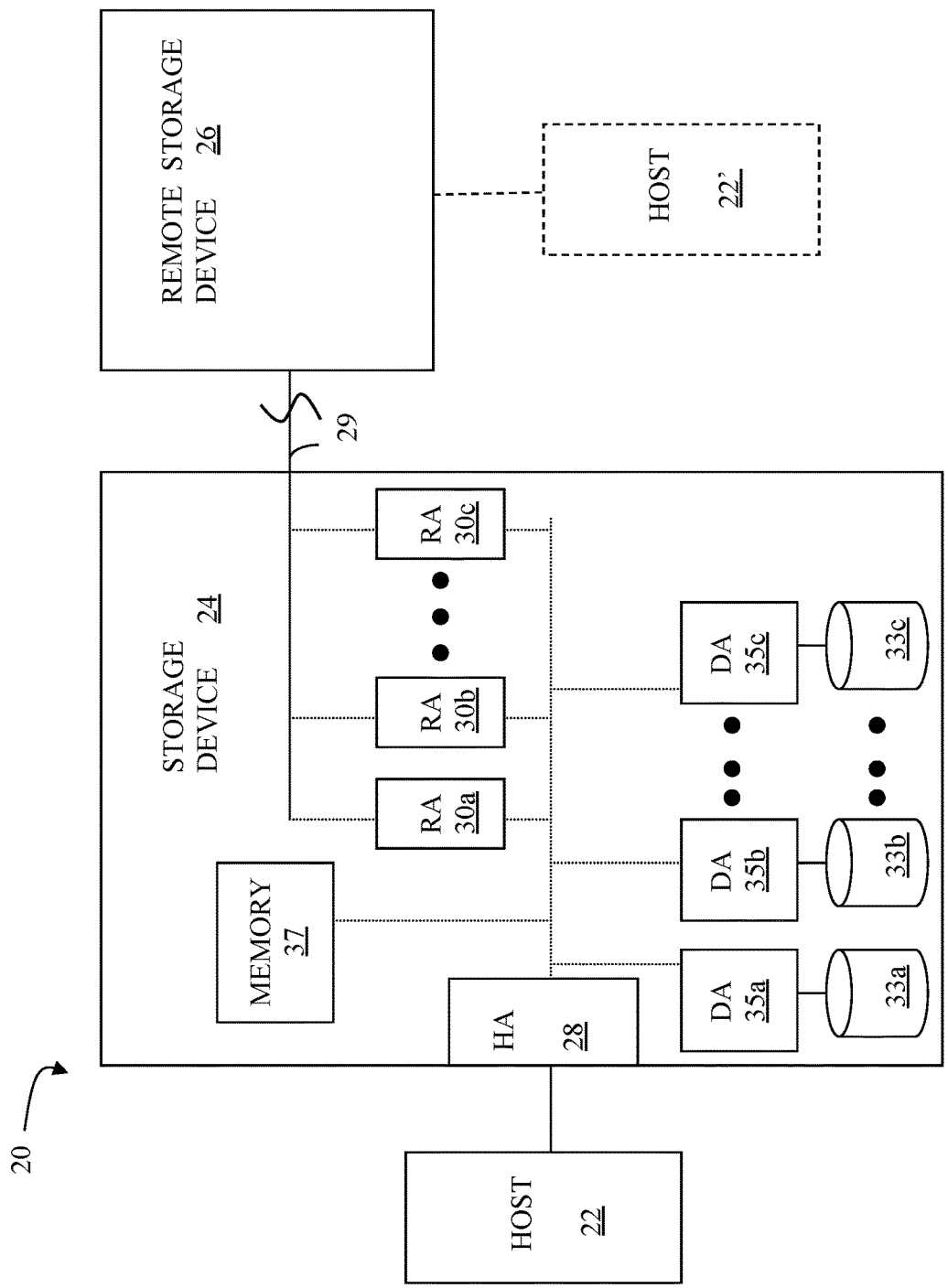
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more physical storage units (including disks, solid state storage devices, etc.), each containing a different portion of data stored on the storage device 24. FIG. 1 shows the storage device 24 having a plurality of physical storage units 33a-33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown in FIG. 1). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage device 24. Note that, in other embodiments, it is possible for more than one physical storage unit to be serviced by a DA and that it is possible for more than one DA to service a physical storage unit. The storage device 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage device 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage device 26 may be subdivided into a plurality of volumes or logical devices, where each of the logical devices may or may not correspond to one or more physical storage units of the remote storage device 26.

In some embodiments, an other host 22' may be provided. The other host 22' is coupled to the remote storage device 26 and may be used for disaster recovery so that, upon failure at a site containing the host 22 and the storage device 24, operation may resume at a remote site containing the remote storage device 26 and the other host 22'. In some cases, the host 22 may be directly coupled to the remote storage device 26, thus protecting from failure of the storage device 24 without necessarily protecting from failure of the host 22.

Figure 2:
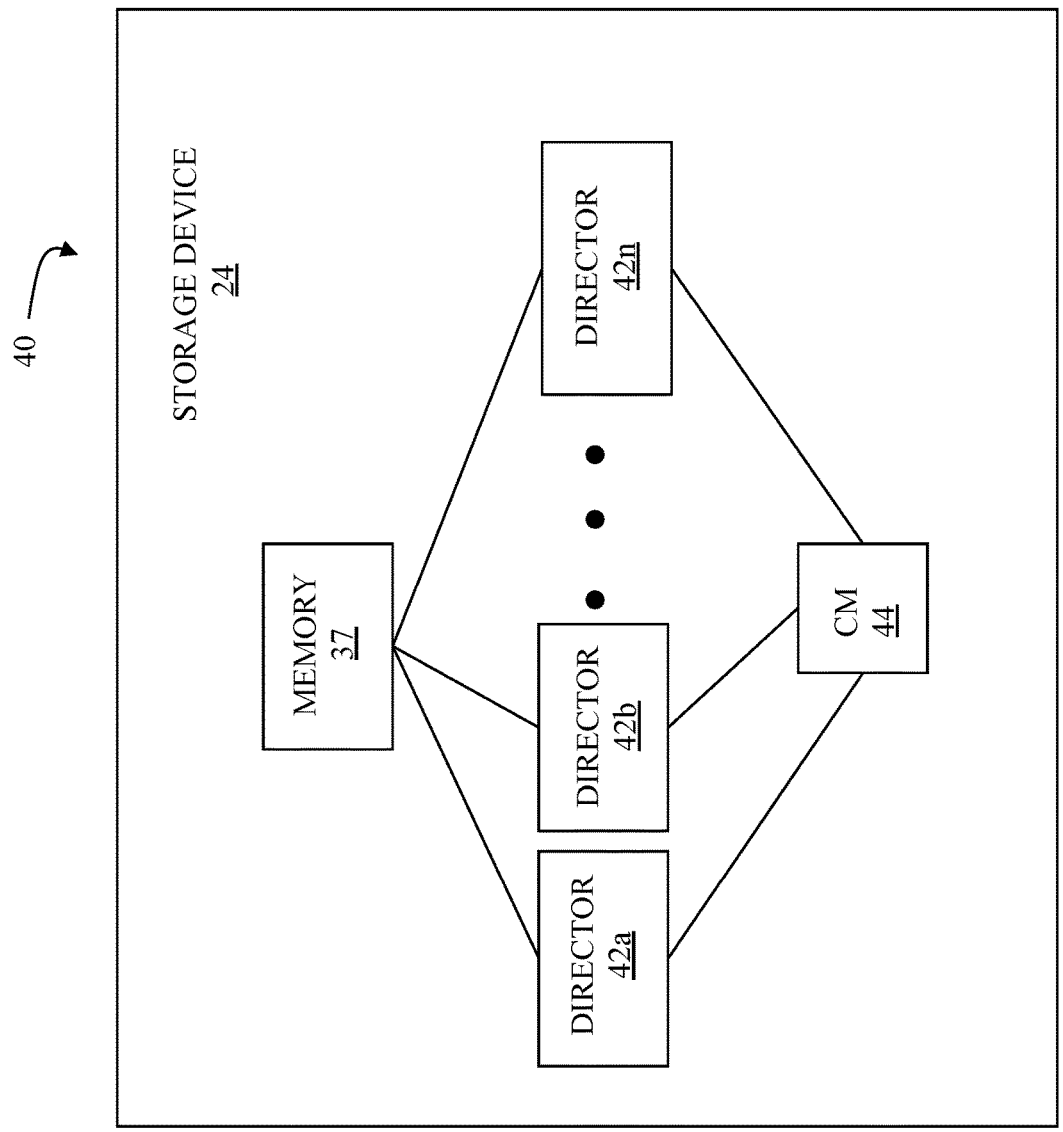
FIG. 2 is a schematic diagram illustrating an embodiment of a storage device where each of a plurality of directors are coupled to a memory according to an embodiment of the system described herein.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
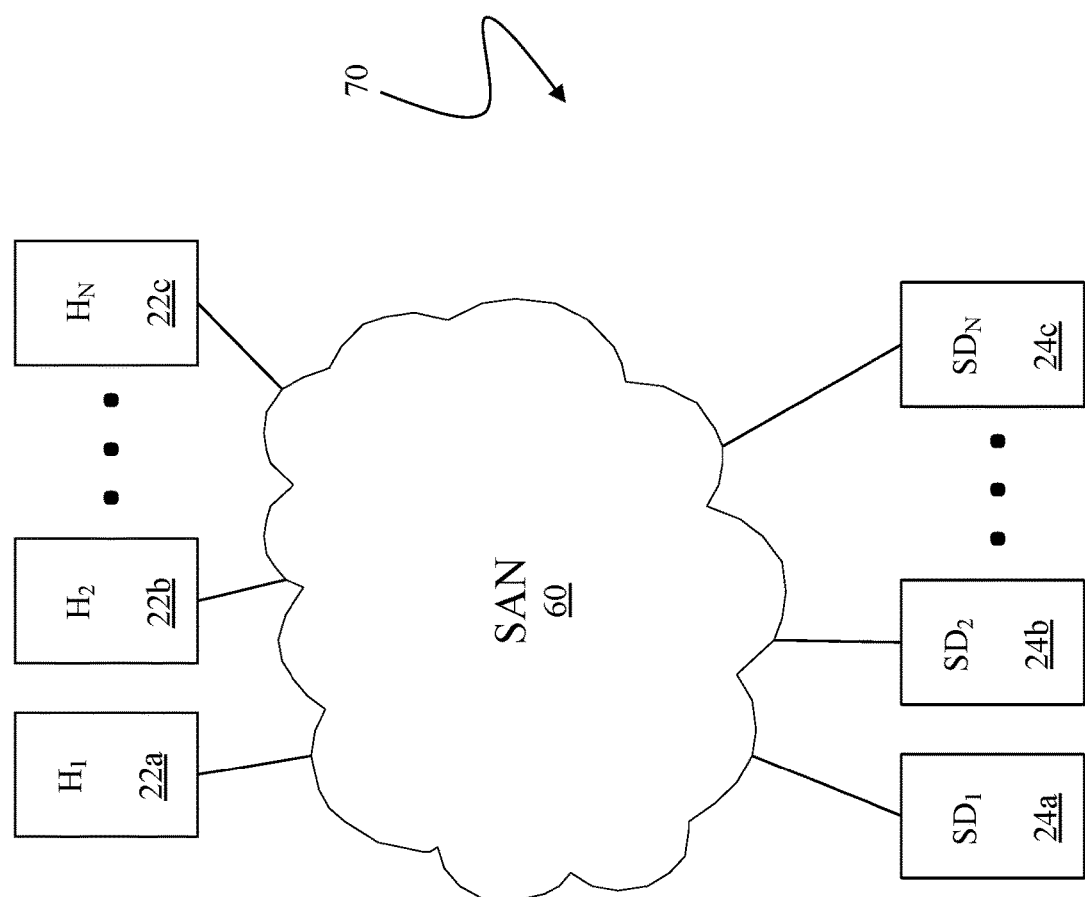
FIG. 3 is a schematic illustration showing a storage area network (SAN) providing a SAN fabric coupling a plurality of host devices to a plurality of storage devices that may be used in connection with an embodiment of the system described herein.

FIG. 3 is a schematic illustration 70 showing a storage area network (SAN) 60 providing a SAN fabric coupling a plurality of host devices ($H_1$-$H_N$) 22a-c to a plurality of storage devices ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from Dell EMC.

Figures 4, 5:
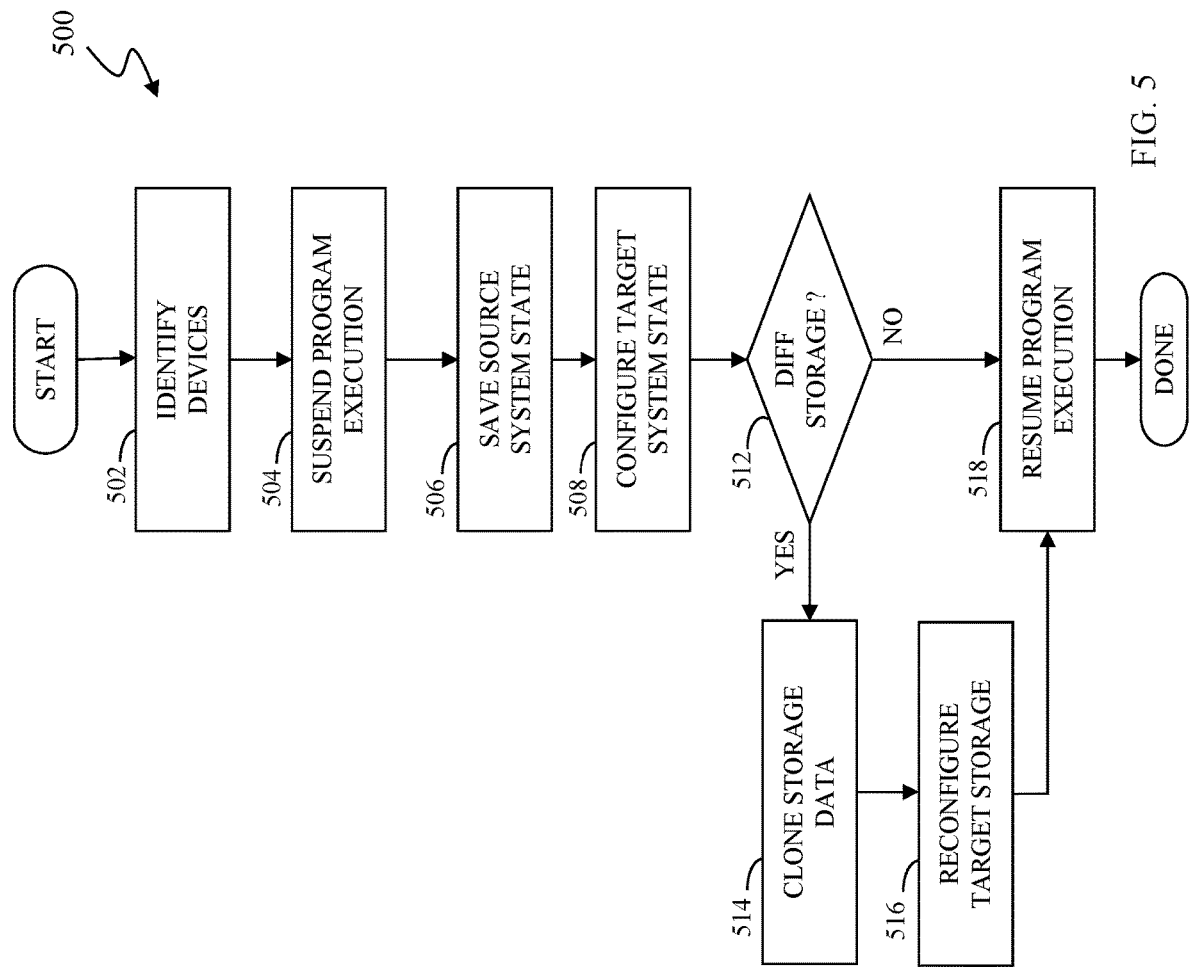
FIG. 4 is a schematic illustration of a physical computing system that may be cloned according to an embodiment of the system described herein.
FIG. 5 is a flow diagram illustrating cloning a running physical computing system according to an embodiment of the system described herein.

Referring to FIG. 4, a physical computing system 400 (e.g., a host device) is shown as including a plurality of logical partitions 402-404 (LPARs) and a plurality of physical resources 406, such as processors, internal memory, etc. In an embodiment herein, the physical computing system 400 is provided by an IBM z-series mainframe computer, but of course other types of computing systems may be used. Controllers (not shown) that are part of the computing system 400 allocate different portions of the physical resources to the LPARs 402-404. In some cases, such as internal memory, each discrete portion of a physical resource may be allocated to only one of the LPARs 402-404. In other cases, discrete physical resources, such as processors, may be shared between two or more of the LPARs 402-404. Each of the LPARs 402-404 includes sufficient resources to operate as an independent system and each of the LPARs 402-404 may appear to outside devices/observers as a discrete computing system. Thus, for example, the LPAR 402 may run the Linux operating system and appear as a first discrete computing system while the LPAR 403 runs the z/OS operating system and appears as a second discrete computing system separate from the first computing system.

The system described herein clones a source running computer system provided by one of the LPARs 402-404 and then runs the source computer system and a corresponding target (clone) computer system at the same time. The source running computer system may be a production system in an organization that needs to be tested with new software/functionality, but cannot be taken offline for commercial and/or logistical reasons. In such a case, the target computing system may be used for testing new software/functionality without appreciably affecting the organization and without modifying the source production computing system. In some cases, the clone computing system may access the same data sets as the source production computing system (e.g., in instances where the target computing system is only reading data). In other instances (e.g., when data is being written), the target computing system may be configured to operate on different data sets that may or may not be a copy of corresponding data sets accessed by the source computing system. This is described in more detail elsewhere herein. Note also that, since each of the LPARs 402-404 functions as an independent computing system, then the system described herein may clone a running computing system from one of the LPARs 402-404 to another one of the LPARs 402-404 so that the source and target computing systems are co-located in the same physical computing system enclosure (e.g., the physical computing system 400).

Referring to FIG. 5, a flow diagram 500 illustrates processing performed in connection with cloning a running computing system. Processing begins at a first step 502 where all of the devices, files, etc. (i.e., external resources) are identified for the source computing system prior to initiating the cloning operation. Note that the target (cloned) computing system may need access to the external resources in order to operate as a clone of the source computing system. In some cases, the target (cloned) computing system may use the identical resource (e.g., a file that is read by both the source computing system and the target computing system) while in other cases the target computing system may access a different instance of the same type of resource (e.g., the source computing system uses a first keyboard that is separate from a second keyboard used by the target computing system).

Following the step 502 is a step 504 where operations at the source computing system are quiesced. It is useful to quiesce operations on the source computing system so that the source computing system may be placed in a stable state that may be replicated. Note that quiescing the source computing system is not that same as powering off or suspending the source computing system. Instead, the source computing system may be quiesced at the step 504 by halting execution of programs running on the source computing system, but otherwise the source computing system remains fully operational. A possible mechanism for quiescing processes on the source computing system is to mark all of the processes on the source computing system as non-dispatchable. Of course, this may only be for a relatively short amount of time while the system is transitioning.

Following the step 504 is a step 506 where a current state of the source computing system is determined and saved. The configuration information saved at the step 506 includes all of the program status word (PSW) values for all of the programs in a running state on the source computing system as well as all of the control registers and general registers on all CPUs of the source LPAR. The information saved at the step 506 also includes the contents of internal memory (i.e., volatile memory) of the LPAR of the source computing system. In some embodiments, all processors but one may be taken off line prior to saving a state of the source computing system so that only a single processor is actively dispatching work. This facilitates situations where the target computing system may be configured with a different number of processors than the source computing system; upon reinitialization (discussed below) the source computing system and the target computing system would have the same context (i.e., a single running processor).

Following the step 506 is a step 508 where configuration information obtained/saved at the step 506 is applied to the target computing system so that, for example, the memory contents from the LPAR of the internal memory of the source computing system are copied to the internal memory of the LPAR of the target computing system, the register values are duplicated, the storage system configuration is copied, etc. Following the step 508 is a test step 512 where it is determined if the source computing system and the target computing system will be sharing the same storage device(s)/data. As discussed elsewhere herein, in instances where the source computing system and the target computing system only read files, it may be acceptable to share the data sets between the computing systems. However, in instances where there is a possibility that the target computing system may write data to a production file system, it may be advantageous to have the target file system write data to a location other than the production file system. If it is determined at the test step 512 that different storage is needed, then control transfers from the test step 512 to a step 514 where storage from the source computing system is cloned for use by the target computing system. Although it is possible to duplicate all of the data at the step 514, in some embodiments snapshot copies are used to reduce the time and storage resources that are needed. In some cases, the Snap Vx product from Dell EMC is used at the step 514 to obtain a snapshot of the data that may be modified independently from the production data.

Following the step 514 is a step 516 where adjustments are made to the storage configuration of the target computing device to account for using different storage than the source computing device. The adjustment may be necessary at the step 516 because of the configuration information was duplicated at the steps 504, 506, discussed above, prior to cloning the data at the step 514. However, in some cases, adjustments might not be needed because the target devices exactly matches the configuration of the source devices (i.e., all device numbers are the same for the source computing system and the target computing system even though the target devices are actually referencing the new cloned data). Following the step 516 is a step 518 where both the source computing device and the target computing device are made to resume operation by allowing the programs in each to resume execution. As discussed elsewhere herein, neither the source computing system or the target computing system needs to be restarted, IPL'd, or rebooted; both systems resume from whatever state the source computing system was in (e.g., conventional running state) just prior to initiating the cloning operation. Following the step 518, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of cloning a source logical partition to a target logical partition in a physical computing system, comprising:

allocating a first set of physical resources to the source logical partition, wherein the first set of physical resources includes a plurality of physical processors;

allocating a second set of physical resources to the target logical partition, wherein the second set of physical resources includes at least one physical processor and wherein the first set of physical resources and the second set of physical resources have a different number of physical processors and wherein the source logical partition has a different number of physical processors allocated thereto than the target logical partition;

taking all the physical processors of the first set of physical resources off line except for one of the physical processors of the first set of physical resources so that only the one of the physical processors of the first physical set of resources is running;

quiescing processes running on the source logical partition, wherein the source logical partition is running on at least the one of the physical processors of the first physical set of resources;

saving state data of the source logical partition after quiescing processes running on the source logical partition and after taking all the physical processors of the first set of physical resources off line except for the one of the physical processors, wherein the state data includes program status word values of processes in a running state on the source logical partition, control registers, general registers, and contents of internal memory of the source logical partition;

configuring the target logical partition using the state data from the source logical partition;

cloning file data that is accessed by the source logical partition for access by the target logical partition, wherein the file data is separate from the state data and wherein cloning the file data is separate from saving the state data;

adjusting a storage configuration of the target logical partition to access the file data; and resuming program execution at the source logical partition and the target logical partition after cloning the file data and after quiescing processes running on the source logical partition, wherein after resuming execution, the source logical partition has a single running physical processor of the plurality of physical processors and the target logical partition has a single running physical processor.

2. A method, according to claim 1, wherein quiescing processes running on the source logical partition includes halting execution of the processes on the source logical partition.

3. A method, according to claim 1, wherein external resources are identified for the source logical partition prior to quiescing processes running on a source logical partition.

4. A method, according to claim 3, wherein the external resources include devices and files.

5. A method, according to claim 4, wherein external files are provided by a storage system that is separate from the physical computing system.

6. A method, according to claim 5, wherein the physical computing system communicates with the storage system using a storage area network.

7. A method, according to claim 1, wherein the target logical partition accesses file data that is also accessed by the source logical partition.

8. A method, according to claim 1, wherein the file data is cloned using snapshot copies.

9. A non-transitory computer readable medium containing software that clones a source logical partition to a target logical partition in a physical computing system with a first set of physical resources that includes a plurality of processors and is allocated to the source logical partition and a second set of physical resources that includes at least one physical processor and is allocated to the target logical partition, wherein the first set of physical resources and the second set of physical resources have a different number of physical processors and wherein the source logical partition has a different number of physical processors allocated thereto than the target logical partition, the software comprising:

executable code that takes all the physical processors of the first set of physical resources off line except for one of the physical processors of the first set of physical resources, so that only the one of the physical processors of the first physical set of resources is running;

executable code that quiesces processes running on the source logical partition, wherein the source logical partition is running on at least the one of the physical processors of the first physical set of resources that is running on the source logical partition;

executable code that saves state data of the source logical partition after quiescing processes running on the source logical partition and after taking all the physical processors of the first set of physical resources off line except for the one of the physical processors, wherein the state data includes program status word values of processes in a running state on the source logical partition, control registers, general registers, and contents of internal memory of the source logical partition;

executable code that configures the target logical partition using the state data from the source logical partition;

executable code that clones file data that is accessed by the source logical partition for access by the target logical partition, wherein the file data is separate from the state data and wherein the file data is cloned separately from saving the state data;

executable code that adjusts a storage configuration of the target logical partition to access the file data; and executable code that resumes program execution at the source logical partition and the target logical partition after cloning the file data and after quiescing processes running on the source logical partition, wherein after resuming execution, the source logical partition has a single running physical processor of the plurality of physical processors and the target logical partition has a single running physical processor.

10. A non-transitory computer readable medium, according to claim 9, wherein quiescing processes running on the source logical partition includes halting execution of the processes on the source logical partition.

11. A non-transitory computer readable medium, according to claim 9, wherein external resources are identified for the source logical partition prior to quiescing processes running on a source logical partition.

12. A non-transitory computer readable medium, according to claim 11, wherein the external resources include devices and files.

13. A non-transitory computer readable medium, according to claim 12, wherein external files are provided by a storage system that is separate from the physical computing system.

14. A non-transitory computer readable medium, according to claim 13, wherein the physical computing system communicates with the storage system using a storage area network.

15. A non-transitory computer readable medium, according to claim 9, wherein the target logical partition accesses file data that is also accessed by the source logical partition.

16. A non-transitory computer readable medium, according to claim 9, wherein the file data is cloned using snapshot copies.

* * * * *